(12) United States Patent
Miki et al.

(10) Patent No.: US 11,413,842 B2
(45) Date of Patent: Aug. 16, 2022

(54) RUBBER LAMINATE AND FLEXIBLE HOSE USING SAME

(71) Applicant: NICHIRIN CO., LTD., Kobe (JP)

(72) Inventors: Kenji Miki, Himeji (JP); Ryota Kojima, Himeji (JP); Yasushi Takeo, Himeji (JP)

(73) Assignee: NICHIRIN CO., LTD., Kobe (JP)

( * ) Notice: Subject to any disclaimer, the term of this patent is extended or adjusted under 35 U.S.C. 154(b) by 702 days.

(21) Appl. No.: 16/341,407

(22) PCT Filed: Oct. 30, 2017

(86) PCT No.: PCT/JP2017/039174
§ 371 (c)(1),
(2) Date: Apr. 11, 2019

(87) PCT Pub. No.: WO2018/088266
PCT Pub. Date: May 17, 2018

(65) Prior Publication Data
US 2020/0040171 A1 Feb. 6, 2020

(30) Foreign Application Priority Data

Nov. 8, 2016 (JP) .............................. JP2016-217883

(51) Int. Cl.
| | | |
|---|---|---|
| *B32B 1/08* | (2006.01) | |
| *F16L 11/04* | (2006.01) | |
| *B32B 25/16* | (2006.01) | |
| *B32B 25/18* | (2006.01) | |
| *C08J 5/12* | (2006.01) | |
| *C08L 23/16* | (2006.01) | |
| *F16L 11/08* | (2006.01) | |

(52) U.S. Cl.
CPC .............. *B32B 1/08* (2013.01); *B32B 25/16* (2013.01); *B32B 25/18* (2013.01); *C08J 5/121* (2013.01); *C08L 23/16* (2013.01); *F16L 11/04* (2013.01); *B32B 2250/02* (2013.01); *B32B 2250/248* (2013.01); *B32B 2307/732* (2013.01); *C08J 2323/22* (2013.01); *C08J 2423/16* (2013.01); *C08L 2205/03* (2013.01); *C08L 2312/00* (2013.01); *F16L 11/08* (2013.01)

(58) Field of Classification Search
CPC ......... B32B 1/08; B32B 25/04; B32B 25/042; B32B 25/08; B32B 25/14; B32B 25/16; B32B 25/18; B32B 27/32; B32B 2250/02; B32B 2250/248; B32B 2307/732; B32B 2597/00; F16L 11/04; F16L 11/08; F16L 11/10; C08L 23/16; C08L 2205/03; C08L 2312/00; C08J 5/121
See application file for complete search history.

(56) References Cited

U.S. PATENT DOCUMENTS

| | | | | | |
|---|---|---|---|---|---|
| 5,112,660 | A | * | 5/1992 | Saito | ...................... F16L 11/12 428/36.2 |
| 5,526,848 | A | * | 6/1996 | Terashima | ................ B32B 1/08 138/125 |
| 2010/0260991 | A1 | * | 10/2010 | Subramanian | .......... B32B 27/40 428/424.7 |
| 2015/0247032 | A1 | * | 9/2015 | Takatani | ................. B32B 25/10 524/451 |

FOREIGN PATENT DOCUMENTS

| | | |
|---|---|---|
| JP | H231095 A | 2/1990 |
| JP | H391545 A | 4/1991 |
| JP | H11257551 A | 9/1999 |
| JP | 2000220770 A | 8/2000 |
| JP | 2002194148 A | 7/2002 |
| JP | 3372475 B2 | 2/2003 |
| JP | 2003278958 A | 10/2003 |
| JP | 2006032106 A | 2/2006 |
| JP | 3891718 B2 | 3/2007 |
| JP | 2007098900 A | 4/2007 |
| JP | 2009040879 A | 2/2009 |
| JP | 2012025829 A | 2/2012 |
| JP | 2013217445 A | 10/2013 |
| JP | 2013228081 A | 11/2013 |

OTHER PUBLICATIONS

International Search Report (ISR) dated Jan. 16, 2018, issued for International application No. PCT/JP2017/039174. (1 page).
Notification Concerning Transmittal of International Preliminary Report on Patentability (PCT/IB326) and Notification of Transmittal of Translation of the International Preliminary Report on Patentability (PCT/IB/338) dated May 23, 2019, with International Preliminary Report on Patentability (PCT/IB/373) and Written Opinion of the International Searching Authority (PCT/ISA/237), for corresponding international application PCT/JP2017/039174, (11 pages).
Extended European Search Report (EESR) dated Apr. 17, 2020, issued for European counterpart patent application No. EP17868523.6 (7 pages).

* cited by examiner

*Primary Examiner* — Walter Aughenbaugh
(74) *Attorney, Agent, or Firm* — Law Office of Katsuhiro Arai

(57) ABSTRACT

A non-crosslinked rubber laminate which is a rubber laminate includes a butyl rubber-containing layer stacked with an ethylene propylene diene rubber and/or ethylene propylene rubber-containing layer, wherein such non-crosslinked rubber laminate is characterized in that the ethylene propylene diene rubber and/or ethylene propylene rubber-containing layer is a rubber-containing layer that contains a low-molecular-weight polyolefin, a phenolic resin, and a crosslinking agent, where: the low-molecular-weight polyolefin is contained by 40 to 70 parts by weight, the phenolic resin is contained by 1 to 4 parts by weight, and the crosslinking agent is contained by at least 1 part by weight, relative to the ethylene propylene diene rubber and/or ethylene propylene rubber constituting a total of 100 parts by weight. An air conditioning hose made of the rubber laminate, for example, can accommodate POE-based lubricating oils and retain vibration absorption characteristics.

5 Claims, No Drawings

RUBBER LAMINATE AND FLEXIBLE HOSE USING SAME

CROSS-REFERENCE TO RELATED APPLICATIONS

This application is the U.S. National Phase under 35 U.S.C. § 371 of International Application PCT/JP2017/039174, filed Oct. 30, 2017, which claims priority to Japanese Patent Application No. 2016-217883, filed Nov. 8, 2016. The International Application was published under PCT Article 21(2) in a language other than English.

TECHNICAL FIELD

The present invention relates to a rubber laminate and a flexible hose using such laminate.

BACKGROUND ART

In general, automobiles, etc., use refrigerant transfer hoses that are selected as deemed appropriate from the types having the structures disclosed in Patent Literatures 1 and 2.

Meanwhile, many electric compressors currently installed on hybrid cars and other eco-cars as part of air conditioning systems use lubricating oils based on polyol esters (hereinafter referred to as "POE"), not the lubricating oils based on polyalkylene glycols (hereinafter referred to as "PAG") traditionally used for this purpose. Now, use of POE-based lubricating oils presents no problems for the hose disclosed in Patent Literature 1 whose innermost layer is made of polyamide resin; on the other hand, the hose disclosed in Patent Literature 2 whose innermost layer is made of butyl rubber (hereinafter also referred to as "IIR" depending on the circumstance), is likely to present problems from using POE-based lubricating oils because the IIR constituting its innermost layer has poor compatibility with POE-based lubricating oils and could therefore swell. However, there is still high demand for hoses whose inner tube is constituted only by a rubber layer, like those of the structure (inner tube: rubber layer) disclosed in Patent Literature 2, because they are much more flexible and offer greater vibration absorption characteristics, greater ease of installation, etc., compared to hoses of the structure (inner tube: resin layer+ rubber layer) disclosed in Patent Literature 1.

Accordingly, one idea is to use nitrile rubber (hereinafter referred to as "NBR") which has high POE oil resistance (POE lubricating oil resistance) and is also inexpensive; NBR may be blended into the IIR constituting the innermost layer of a hose of the structure disclosed in Patent Literature 2 to improve its POE oil resistance, or a protective layer made of NBR may be provided on the internal fluid side, or innermost layer side, of the hose. When NBR is blended into IIR, however, it is difficult to retain both the gas barrier property of IIR and the POE oil resistance of NBR; preferably, therefore, a layer made of NBR is laminated with the IIR layer in such a way that the NBR layer is provided on the internal fluid side as an independent protective layer.

Now, one bonding method to laminate these two independent layers is to bond the IIR layer and the NBR layer using an adhesive; however, this method requires an adhesive-based bonding step and may not always provide sufficient adhesion strength. So, one idea is to crosslink and bond the IIR layer and the NBR layer, but because IIR and NBR have very different SP values (SP indicates solubility level) and are highly incompatible with each other, no art has been available to date to crosslink and bond the two to obtain a rubber laminate. To solve this problem, Patent Literature 3 describes a laminate comprising two independent rubber composition layers, where a rubber of the same type as the one contained in one rubber composition is blended into the other rubber composition, after which the two rubber compositions are crosslinked and bonded, to bond the poorly compatible rubber layers together.

Also, Patent Literature 4 describes a hydrogen fuel transfer hose for fuel cell vehicles, which is a rubber hose having an inner rubber layer and an outer rubber layer, where the inner rubber layer and the outer rubber layer are each constituted by a halogenated butyl rubber, a blend of halogenated butyl rubber and butyl rubber, or ethylene-propylene-based rubber, and it is explained that, if a butyl rubber is used, it must always contain a halogenated butyl rubber component so that, as a result, hydrogen fuels are not contaminated.

Furthermore, Patent Literature 5 describes how a fuel cell hose offering improved water permeation resistance and gas resistance can be obtained as a result of comprising its inner layer as a layer of a composition that contains ethylene-propylene-diene rubber, liquid polybutene, and peroxide crosslinking agent, while adopting one of various materials such as butyl rubber for its outer layer.

Additionally, there is a need for hoses that can accommodate the new refrigerant HFO-1234yf, among others, and Patent Literature 6 describes an air conditioning hose that can accommodate such refrigerant, where its innermost layer is formed by a composition that contains butyl-based rubber, specific acrylonitrile-butadiene-based copolymer rubber, and scale-like filler, while Patent Literature 7 describes a refrigerant transfer hose that has, on the inner face side of a rubber layer, an inner face layer made of polyamide, polyethylene, and polypropylene, where the side of the inner face layer contacting the rubber layer has a specific modulus of elasticity.

BACKGROUND ART LITERATURE

Patent Literature

Patent Literature 1: Japanese Patent No. 3891718
Patent Literature 2: Japanese Patent No. 3372475
Patent Literature 3: Japanese Patent Laid-open No. 2007-98900
Patent Literature 4: Japanese Patent Laid-open No. 2003-278958
Patent Literature 5: Japanese Patent Laid-open No. 2006-32106
Patent Literature 6: Japanese Patent Laid-open No. 2013-228081
Patent Literature 7: Japanese Patent Laid-open No. 2013-217445

SUMMARY OF THE INVENTION

Problems to be Solved by the Invention

However, the method described in Patent Literature 3, where different rubber components are mixed in one or the other rubber composition, or both, may not allow each rubber layer to fully demonstrate its characteristics (such as oil resistance of one rubber and gas barrier property of the other) or it may cause such characteristics to drop. Additionally, as described in Patent Literatures 4 to 6, hoses used for transferring fuels or for air conditioning require that they are resistant to and do not contaminate fuels, while remaining stable in the presence of new refrigerants without swelling or dissolving.

Furthermore, these fuel transfer hoses and air conditioning hoses must prevent vibrations from the engine and vehicle body from transmitting through the hoses to generate loud noises inside the cabin.

An object of the present invention is to provide a rubber laminate by crosslinking and bonding two rubber layers while retaining the characteristics of each rubber layer, instead of blending together different rubber components or using an adhesive, wherein an air conditioning hose obtained by applying such rubber laminate can also accommodate POE-based lubricating oils and retain vibration absorption characteristics.

Means for Solving the Problems

To achieve the aforementioned object, the present invention adopted the following constitutions:
1. A non-crosslinked rubber laminate which is a rubber laminate comprising a butyl rubber-containing layer stacked with an ethylene propylene diene rubber and/or ethylene propylene rubber-containing layer, wherein such non-crosslinked rubber laminate is characterized in that the ethylene propylene diene rubber and/or ethylene propylene rubber-containing layer is a rubber-containing layer that contains a low-molecular-weight polyolefin, a phenolic resin, and a crosslinking agent, where:
the low-molecular-weight polyolefin is contained by 40 to 70 parts by weight,
the phenolic resin is contained by 1 to 4 parts by weight, and the crosslinking agent is contained by at least 1 part by weight,
relative to the ethylene propylene diene rubber and/or ethylene propylene rubber constituting a total of 100 parts by weight.
2. A non-crosslinked rubber laminate according to 1 above, characterized in that the low-molecular-weight polyolefin is a polybutene, and the crosslinking agent is an organic peroxide.
3. A crosslinked rubber laminate which is a rubber laminate comprising a butyl rubber-containing layer stacked with an ethylene propylene diene rubber and/or ethylene propylene rubber-containing layer, wherein such crosslinked rubber laminate is characterized in that the ethylene propylene diene rubber and/or ethylene propylene rubber-containing layer is a rubber-containing layer that contains a low-molecular-weight polyolefin and a phenolic resin, and has been crosslinked by a peroxide, where:
the low-molecular-weight polyolefin is contained by 40 to 70 parts by weight, and
the phenolic resin is contained by 1 to 4 parts by weight,
relative to the ethylene propylene diene rubber and/or ethylene propylene rubber constituting a total of 100 parts by weight; and
the butyl rubber-containing layer is crosslinked and bonded with the ethylene propylene diene rubber and/or ethylene propylene rubber-containing layer.
4. A flexible hose characterized in that it has a structure of the rubber laminate according to 3 above.
5. A flexible hose according to 4 above, characterized in that:
the innermost layer side of the flexible hose is constituted by the ethylene propylene diene rubber and/or ethylene propylene rubber-containing layer;
the thickness of the butyl rubber-containing layer is 1.1 mm or more; and
the thickness of the butyl rubber layer is at least 1.4 times the thickness of the ethylene propylene diene rubber and/or ethylene propylene rubber-containing layer.

Effects of the Invention

According to the present invention, a layer containing butyl rubber can be bonded with a layer containing ethylene propylene diene rubber (hereinafter referred to as "EPDM" depending on the circumstance) and/or ethylene propylene rubber (hereinafter referred to as "EPM" depending on the circumstance) to a strongly bonded state, and consequently a rubber laminate, and a flexible hose, both offering excellent heat resistance, POE oil resistance, and mechanical strength, and retaining vibration absorption characteristics, can be obtained.

MODE FOR CARRYING OUT THE INVENTION

The present invention is an invention based on a laminate comprising a butyl rubber-containing layer stacked with an ethylene propylene diene rubber and/or ethylene propylene rubber-containing layer that contains a low-molecular-weight polyolefin, a phenolic resin, and a crosslinking agent, as well as a rubber laminate constituted by these layers crosslinked and bonded together.
Favorable embodiments of the present invention are explained in detail below.
[Butyl Rubber-Containing Layer]
For the butyl rubber used under the present invention, any known butyl rubber may be selected as desired
Among others, preferably a halogenated butyl rubber is selected and adopted by considering its mechanical strength and other rubber characteristics.
To the butyl rubber-containing layer under the present invention, other rubbers and resins, as well as various additives that are known to be added to rubber compositions such as carbon black, filler, co-crosslinking agent, crosslinking promoter, crosslinking aid, softener, plasticizer, anti-aging agent, stabilizer, processing aid, etc., can be added as deemed appropriate, to the extent that doing so does not impair the characteristics of butyl rubber or damage the effects that are otherwise achieved by the present invention.
[Ethylene Propylene Diene Rubber and/or Ethylene Propylene Rubber-Containing Layer] (Ethylene Propylene Diene Rubber)
For the ethylene propylene diene rubber used under the present invention, any known ethylene propylene diene rubber may be selected as desired. Among others, one with an ethylene content of 50 to 70 percent by weight is preferred. The diene constituting the EPDM may be: 1,4-hexadiene, 1,5-hexadiene, 1,6-heptadiene, methyl-tetrahydroindene, 4-methyl-1,4-hexadiene, 5-methyl-1,4-hexadiene, 5-methyl-1,5-heptadiene, 6-methyl-1,5-heptadiene, 6-methyl-1,7-octadiene, 7-methyl-1,6-octadiene or other chained unconjugated diene; dicyclopentadiene, 1,5-cyclooctadiene, 1,1-cyclooctadiene, 1,6-cyclododecadiene, 1,7-cyclododecadiene, 1,5,9-cyclododecatriene, 1,4-cycloheptadiene, 1,4-cyclohexadiene, 5-ethylidene-2-norbornene, 5-propylidene-5-norbornene, 5-vinyl-2-norbornene, 5-methylene-2-norbornene, 5-isopropylidene-2-norbornene, norbornadiene, or other cyclic diene; 2,3-diisopropylidene-5-norbornene, 4-ethylidene-8-methyl-1,7-nonadiene, etc.

(Ethylene Propylene Rubber)

For the ethylene propylene rubber used under the present invention, any known ethylene propylene rubber may be selected as desired.

Preferably the ethylene content in the EPM is 30 to 80 percent by weight.

[Low-Molecular-Weight Polyolefin]

The low-molecular-weight polyolefin added to the ethylene propylene diene rubber and/or ethylene propylene rubber-containing layer under the present invention may be, for example, paraffin oil, naphthene oil, liquid IR, liquid EPDM, liquid SBR, liquid polybutadiene, liquid polybutene, etc., among which liquid polybutene is preferred and its number-average molecular weight is 300 to 4000, or preferably 1000 to 3000.

Also, the low-molecular-weight polyolefin may be maleate-modified, epoxy-modified, or hydroxyl-terminated, to enhance its reactivity with rubber.

The content of the low-molecular-weight polyolefin in the ethylene propylene diene rubber and/or ethylene propylene rubber-containing layer, relative to 100 parts by weight of the ethylene propylene diene rubber and/or ethylene propylene rubber, is 40 to 70 parts by weight, or preferably 45 to 65 parts by weight, or more preferably 50 to 60 parts by weight. If the content is less than 40 parts by weight, the POE oil resistance becomes poor and the possibility of swelling, etc., increases when contact with POE oils occurs. If the content exceeds 70 percent by weight, on the other hand, the mechanical strength becomes poor and problems may occur such as the rubber composition sticking to the rolls in the rolling process before crosslinking.

[Phenolic Resin]

The phenolic resin used under the present invention serves as an adhesive between the ethylene propylene diene rubber and/or ethylene propylene rubber-containing layer and the butyl rubber-containing layer. This phenolic resin may be, for example, a resol-type phenolic resin, novolac-type phenolic resin, etc.

The content of the phenolic resin in the ethylene propylene diene rubber and/or ethylene propylene rubber-containing layer, relative to 100 parts by weight of the ethylene propylene diene rubber and/or ethylene propylene rubber, is 1 to 4 parts by weight, or preferably 1 to 3 parts by weight, or more preferably 1 to 2 parts by weight. If the content is less than 1 part by weight, the property of adhesion with the butyl rubber-containing layer is more likely to become poor, while a content exceeding 4 parts by weight causes the heat resistance and mechanical strength of the ethylene propylene diene rubber and/or ethylene propylene rubber-containing layer to drop after crosslinking. Also, problems may occur such as the rubber composition sticking to the rolls in the rolling process before crosslinking.

[Crosslinking Agent]

To obtain the rubber laminate and flexible hose proposed by the present invention, a crosslinking agent may be added in advance to the ethylene propylene diene rubber and/or ethylene propylene rubber-containing layer, to cause crosslinking after the layer is stacked with the butyl rubber-containing layer.

For this crosslinking agent, sulfurs, organic peroxides, etc., may be adopted.

Among these crosslinking agents, any organic peroxide may be used without limitation. Specific examples include benzoyl peroxide, dicumyl peroxide, 2,5-dimethyl-2,5-di-(t-butyl peroxy)-hexane, 1,1'-di-(t-butyl peroxy)-diisopropyl benzene, n-butyl-4,4-di-(t-butyl peroxy)-valerate, 1,1-di-(t-butyl peroxy)-cyclohexane, etc., where preferably 2,5-dimethyl-2,5-di-(t-butyl peroxy)-hexane or 1,1'-di-(t-butyl peroxy)-diisopropyl benzene is used.

In non-crosslinked state, the content of the crosslinking agent in the ethylene propylene diene rubber and/or ethylene propylene rubber-containing layer, relative to 100 parts by weight of the ethylene propylene diene rubber and/or ethylene propylene rubber, is 1 part by weight or more, or preferably 1.5 parts by weight or more, or more preferably 2 parts by weight or more. If the content is less than 1 part by weight, the mechanical strength is more likely to become poor.

[Carbon Black]

In the ethylene propylene diene rubber and/or ethylene propylene rubber-containing layer under the present invention, any carbon black, selected from carbon blacks that are known to be added to rubber compositions, may be used.

In the ethylene propylene diene rubber and/or ethylene propylene rubber-containing layer under the present invention, any co-crosslinking agent or crosslinking aid, selected from co-crosslinking agents and crosslinking aids that are known to be added to rubber compositions, may be used. Specific examples include triaryl cyanurate, triaryl isocyanurate, trimethallyl isocyanurate, ethylene glycol dimethacrylate, trimethylol propane trimethacrylate, 1,2-polybutadiene, magnesium acrylate, zinc acrylate, magnesium methacrylate, zinc methacrylate, hexamethylene diamine carbamate, P-quinone dioxime, P,P'-dibenzoyl quinone dioxime, N,N'-m-phenylene bismaleimide, amyl phenol disulfide polymers, sulfurs, etc., where preferably triaryl isocyanurate is used.

To the ethylene propylene diene rubber and/or ethylene propylene rubber-containing layer under the present invention, other rubbers and resins, as well as various additives that are known to be added to rubber compositions such as co-crosslinking agent, filler, crosslinking promoter, softener, plasticizer, anti-aging agent, stabilizer, processing aid, etc., can be added as deemed appropriate, to the extent that doing so does not impair the characteristics of the ethylene propylene diene rubber and/or ethylene propylene rubber-containing layer or damage the effects that are otherwise achieved by the present invention.

[Rubber Laminate]

The shape of the rubber laminate proposed by the present invention, whether not yet crosslinked or already crosslinked, is not limited in any way and it may have a sheet-like, rod-like, tube-like, or hose-like shape, among others; in particular, preferably the rubber laminate is made into a flexible hose whose innermost layer side is constituted by the ethylene propylene diene rubber and/or ethylene propylene rubber-containing layer.

This hose, etc., may be used in applications where it comes in contact with POE-based or other lubricating oils or refrigerants.

The rubber laminate is processed into a desired shape as mentioned above, and then crosslinked under a set of conditions selected from known crosslinking conditions. As a result, the organic peroxide or other crosslinking agent that was contained in the non-crosslinked rubber laminate is consumed to the point where the majority of it no longer remains in the crosslinked rubber laminate.

At the same time, the butyl rubber-containing layer, and the ethylene propylene diene rubber and/or ethylene propylene rubber-containing layer, are strongly crosslinked and bonded with each other.

Also, if necessary, a reinforcement layer of organic fibers, etc., may be formed on the outer periphery of the butyl rubber-containing layer side, and then an outer layer of rubber composition, etc., may be formed on the outer periphery of the reinforcement layer.

[Manufacturing Method of Hose]

For the method by which to manufacture the flexible hose proposed by the present invention, a method where the rubber laminate proposed by the present invention is extruded via a two-layer extruder, etc., onto the outer periphery of a mandrel to create a cylinder-shaped cover for hose, after which this rubber laminate is heated to cause crosslinking, may be adopted.

Alternatively, a rubber composition for EPDM and/or EPM-containing layer is extruded into a cylinder shape for use on the innermost layer side of the flexible hose, after which a rubber composition for IIR-containing layer is extruded into a cylinder shape for use as the second layer which is then stacked over the outer periphery of the EPDM and/or EPM-containing layer, and the resulting rubber laminate is heated to cause crosslinking. It should be noted that, after the extrusion (lamination) step, a fiber reinforcement layer and an outermost rubber layer may be formed on the outer periphery of the IIR-containing layer, as necessary.

Heating causes the EPDM and/or EPM to undergo crosslinkage in the EPDM and/or EPM-containing layer to produce a crosslinked EPDM and/or EPM-containing layer, while also causing the IIR to undergo crosslinkage in the rubber composition for the IIR-containing layer to produce a crosslinked IIR-containing layer, and simultaneously these two layers are stacked together in a manner exhibiting high adhesion strength.

Also, this hose may be applied as a flexible hose that has vibration absorption characteristics. When applied as a flexible hose, it may be used as an automotive air conditioning hose, for example.

The present invention may be applied as a hose which is used when the fluid that will flow inside the hose is a POE-based lubricating oil or refrigerant. The innermost layer side of the hose may be a layer obtained by crosslinking the EPDM and/or EPM-containing layer under the present invention, while a layer obtained by crosslinking the IIR-containing layer may be provided on the outer periphery of the EPDM and/or EPM-containing layer.

While its thickness is set smaller than the thickness of the IIR-containing layer, the layer obtained by crosslinking the EPDM and/or EPM-containing layer only needs to have a certain thickness before it can demonstrate sufficient resistance to the POE-based lubricating oil or refrigerant that flows inside, without inhibiting the gas barrier property and other characteristics of the IIR-containing layer present on its outer periphery. Furthermore, even when the total thickness of EPDM and/or EPM-containing layer and IIR-containing layer is 1.9 mm, the hose as a whole becomes resistant to POE-based lubricating oils and refrigerants while also demonstrating vibration absorption characteristics if the IIR-containing layer has a thickness at least 1.4 times, or preferably at least 2.0 times, or more preferably at least 3.0 times, the thickness of the EPDM and/or EPM-containing layer.

Additionally, so long as setting the total thickness of EPDM and/or EPM-containing layer and IIR-containing layer to exceed 1.9 mm does not present problems in practical use, the IIR-containing layer may have a thickness of 1.1 mm or more and/or the EPDM and/or EPM-containing layer may have a thickness of 0.8 mm or more.

EXAMPLES

Next, the present invention is explained in further detail based on examples; it should be noted, however, that the present invention is not limited to these examples.

EPDM-containing layers were formed, each containing the respective components listed in Table 1 below, and IIR-containing layers were formed separately, after which test pieces were produced as described below.

The obtained test pieces were measured for characteristics from the viewpoints described below.

(Adhesion Property Between EPDM and IIR)

A non-crosslinked EPDM rubber sheet of 2 mm in thickness was crosslinked and bonded by means of press-heating with a non-crosslinked IIR rubber sheet (rubber composition constituted by a chlorinated butyl rubber containing carbon black, crosslinking agent, crosslinking promoter, crosslinking aid, anti-aging agent, filler and other commercial compounding agents) of 2 mm in thickness, after which the bonded sheets were cut to 10 mm wide×100 mm long in size, to prepare a test piece.

In accordance with the test method specified in JIS K6256-1, "Rubber, vulcanized or thermoplastic—Determination of adhesion strength—Part 1: Adhesion to textile fabric," the test piece was peeled in a 90° direction at a peel rate of 50 mm/min and evaluated for adhesion strength based on the criteria below.

◯: 1.5 N/mm or more x: Less than 1.5 N/mm (Heat Resistance)

A non-crosslinked EPDM rubber sheet of 2 mm in thickness was crosslinked by means of press-heating, from which a test piece was prepared in the shape of Dumbbell No. 3 as specified in JIS K6251.

In accordance with the test method specified in JIS K6257, "Rubber, vulcanized or thermoplastic—Determination of heat aging properties," the test piece was left for 70 hours in an environment of 100° C. and then evaluated for rate of change in elongation based on the criteria below.

◯: −20% or more x: Less than −20%

(POE Oil Resistance)

A non-crosslinked EPDM rubber sheet of 2 mm in thickness was crosslinked by means of press-heating, after which the crosslinked sheet was cut to 20 mm wide×50 mm long in size, to prepare a test piece.

In accordance with the test method specified in JIS K6258, "Rubber, vulcanized or thermoplastic—Determination of the effect of liquids," the test piece was left for 70 hours in an environment of 100° C. and then evaluated for rate of change in volume based on the criteria below. A POE-based lubricating oil was used as the test oil.

◯: Within a range of ±5% x: Outside a range of ±5%

(Mechanical Strength (Modulus))

Tensile strength at 100% elongation (M100) was evaluated based on the criteria below, in accordance with JIS K6251, "Rubber, vulcanized or thermoplastic—Determination of tensile stress-strain properties." For the test piece, one prepared in the shape of Dumbbell No. 3 as specified in JIS K6251 above was used.

◯: 1.8 MPa or more x: Less than 1.8 MPa

TABLE 1

| | | [Examples] | | | | | | | | |
|---|---|---|---|---|---|---|---|---|---|---|
| | | 1 | 2 | 3 | 4 | 5 | 6 | 7 | 8 | 9 |
| EPDM | | 100 | 100 | 100 | 100 | 100 | 100 | 100 | 100 | 100 |
| Carbon black (SRF) | | 40 | 40 | 40 | 40 | 40 | 40 | 40 | 40 | 40 |
| Carbon black (FEF) | | 70 | 70 | 70 | 70 | 70 | 70 | 70 | 70 | 70 |
| Zinc oxide | | 5 | 5 | 5 | 5 | 5 | 5 | 5 | 5 | 5 |
| Stearic acid | | 1 | 1 | 1 | 1 | 1 | 1 | 1 | 1 | 1 |
| Co-crosslinking agent *1 | | 1 | 1 | 1 | 1 | 1 | 1 | 1 | 1 | 1 |
| Low-molecular-weight polyolefin *2 | | 40 | 55 | 70 | 55 | 55 | 55 | 55 | 55 | 55 |
| Organic peroxide [1] *3 | | — | — | — | 1 | 2 | — | — | — | — |
| Organic peroxide [2] *4 | | 2.5 | 2.5 | 2.5 | — | — | 2 | 3 | 2.5 | 2.5 |
| Phenolic resin *5 | | 1.5 | 1.5 | 1.5 | 1.5 | 1.5 | 1.5 | 1.5 | 1 | 4 |
| (Total) | | 261 | 276 | 291 | 274.5 | 275.5 | 275.5 | 276.5 | 275.5 | 278.5 |
| Adhesion property | EPDM/IIR adhesion strength [N/mm] | 1.6 | 1.8 | 2.0 | 2.1 | 2.0 | 2.1 | 1.7 | 1.8 | 2.1 |
| | Evaluation | ○ | ○ | ○ | ○ | ○ | ○ | ○ | ○ | ○ |
| POE oil resistance | Rate of change in volume [%] | +4.6 | +1.6 | −2.1 | +1.2 | +1.5 | +1.5 | +1.7 | +1.5 | +1.0 |
| | Evaluation | ○ | ○ | ○ | ○ | ○ | ○ | ○ | ○ | ○ |
| Heat resistance | Rate of change in elongation [%] | −2 | −5 | +10 | −8 | −6 | −8 | −7 | +7 | −18 |
| | Evaluation | ○ | ○ | ○ | ○ | ○ | ○ | ○ | ○ | ○ |
| Mechanical strength | Modulus (M100) [MPa] | 4.7 | 3.1 | 2.0 | 1.9 | 2.6 | 2.5 | 3.6 | 3.9 | 1.9 |
| | Evaluation | ○ | ○ | ○ | ○ | ○ | ○ | ○ | ○ | ○ |

| | | [Comparative Examples] | | | | | | | |
|---|---|---|---|---|---|---|---|---|---|
| | | 1 | 2 | 3 | 4 | 5 | 6 | 7 | 8 |
| EPDM | | 100 | 100 | 100 | 100 | 100 | 100 | 100 | 100 |
| Carbon black (SRF) | | 40 | 40 | 40 | 40 | 40 | 40 | 40 | 40 |
| Carbon black (FEF) | | 70 | 70 | 70 | 70 | 70 | 70 | 70 | 70 |
| Zinc oxide | | 5 | 5 | 5 | 5 | 5 | 5 | 5 | 5 |
| Stearic acid | | 1 | 1 | 1 | 1 | 1 | 1 | 1 | 1 |
| Co-crosslinking agent *1 | | 1 | 1 | 1 | 1 | 1 | 1 | 1 | 1 |
| Low-molecular-weight polyolefin *2 | | 0 | 30 | 80 | 55 | 55 | 55 | 55 | 55 |
| Organic peroxide [1] *3 | | 2.5 | 2.5 | 2.5 | 0 | 0.5 | 2.5 | 2.5 | 2.5 |
| Phenolic resin *5 | | 1.5 | 1.5 | 1.5 | 1.5 | 1.5 | 0 | 0.5 | 5 |
| (Total) | | 221 | 251 | 301 | 273.5 | 274 | 274.5 | 275 | 279.5 |
| Adhesion property | EPDM/IIR adhesion strength [N/mm] | 0.9 | 1.4 | 2.1 | — | 2.4 | 0.8 | 0.9 | 2.2 |
| | Evaluation | X | X | ○ | — | ○ | X | X | ○ |
| POE oil resistance | Rate of change in volume [%] | +15.9 | +8.0 | −4.2 | — | +0.9 | +1.0 | +1.6 | +0.8 |
| | Evaluation | X | X | ○ | — | ○ | ○ | ○ | ○ |
| Heat resistance | Rate of change in elongation [%] | 0 | 0 | +6 | — | −10 | 0 | +11 | −24 |
| | Evaluation | ○ | ○ | ○ | — | ○ | ○ | ○ | X |
| Mechanical strength | Modulus (M100) [MPa] | 10.4 | 6.5 | 1.4 | — | 1.5 | 6.0 | 4.9 | 1.6 |
| | Evaluation | ○ | ○ | X | — | X | ○ | ○ | X |

*1 TAIC WH-60 (The values in Table 1 assume a composition of 100% triaryl isocyanurate except for diluent (silica, etc.).)
*2 NOF Polybutene 40SH (Number-average molecular weight: 1400 to 1800)
*3 Perbutyl P
*4 Perhexa 25B-40 (The values in Table 1 assume a composition of 100% peroxide crosslinking agent except for diluent (silica, etc.).)
*5 Tackirol 250-I According to Examples 1 to 9 above, the rubber laminates and rubber compositions conforming to the present invention were found excellent in adhesion property between the EPDM-containing layer and the IIR-containing layer, heat resistance, POE oil resistance, and mechanical strength.

Based on these results, flexible hoses made from these rubber laminates and rubber compositions would have sufficient mechanical strength, demonstrate excellent durability, and withstand use in high-temperature environments, and even when used in environments subject to vibration, they would also have sufficient vibration absorption characteristics as well as sufficient resistance to POE-based lubricating oils and refrigerants.

According to Comparative Examples 1 to 3, on the other hand, a smaller polybutene content resulted in insufficient adhesion property between the EPDM-containing layer and the IIR-containing layer, and durability and POE oil resistance were not sufficient for use in flexible hose applications. Also, a higher polybutene content led to poor mechanical strength.

According to Comparative Examples 4 and 5, an absence of peroxide prevented the EPDM-containing layer from undergoing crosslinkage; whereas a lower peroxide content did allow crosslinking to occur, but the resulting mechanical strength was poor.

According to Comparative Examples 6 to 8, a lower phenolic resin content resulted in insufficient adhesion property between the EPDM-containing layer and the IIR-containing layer, and the durability was not sufficient for use in flexible hose applications; whereas a higher phenolic resin content led to poor heat resistance and mechanical strength.

Using the rubber composition of Example 6 in Table 1, rubber laminates were extruded so that they each had a total thickness of EPDM-containing layer and IIR-containing layer corresponding to 1.9 mm and one of the various thickness ratios in Table 2, after which these rubber laminates were used to produce various flexible hoses.

Then, the obtained various flexible hoses were measured for HFC-134a permeation level. The measurement conditions conformed to "9. Refrigerant Permeation" in the JRA2012-1995 standard in *Refrigerant Hoses for Automotive Air Conditioners* (HFC-134a) issued by the Japan Refrigeration and Air Conditioning Industry Association. The measured results are shown in Table 2.

TABLE 2

|  | Thickness ratio IIR/EPDM | HFC-134a permeation level (g/cm$^2$/year) |
|---|---|---|
| Example 10 | 4.0 | 0.83 |
| Example 11 | 3.0 | 0.86 |
| Example 12 | 2.0 | 0.92 |
| Example 13 | 1.4 | 0.97 |
| Comparative Example 9 | 1.2 | 1.03 |
| Comparative Example 10 | 1.0 | 1.22 |
| Comparative Example 11 | 0.8 | 1.62 |

According to the results in Table 2, the HFC-134a permeation level satisfies the JRA standard (1.0 g/cm$^2$/year or less) when the total thickness of EPDM and/or EPM-containing layer and IIR-containing layer is 1.9 mm AND the thickness of the IIR-containing layer is 1.1 mm or more, which means that the thickness of the IIR-containing layer relative to the thickness of the EPDM and/or EPM-containing layer corresponds to an "IIR-containing layer/EPDM-containing layer" thickness ratio of at least 1.4 times in the aforementioned conditions.

It is understood furthermore, according to these results, that a barrier effect at least exceeding the result of Example 13 can be achieved when the thickness of the IIR-containing layer is 1.1 mm or more AND the thickness of the EPDM-containing layer is 0.8 mm or more (1.9 mm−1.1 mm=0.8 mm), and consequently the JRA standard can be satisfied.

What is claimed is:

1. A non-crosslinked rubber laminate which is a rubber laminate comprising a butyl rubber-containing layer stacked with an ethylene propylene diene rubber and/or ethylene propylene rubber-containing layer, said non-crosslinked rubber laminate characterized in that the ethylene propylene diene rubber and/or ethylene propylene rubber-containing layer is a rubber-containing layer that contains a low-molecular-weight polyolefin, a phenolic resin, and a crosslinking agent, where:
    the low-molecular-weight polyolefin has a number-average molecular weight of 300 to 4000 and is contained by 40 to 70 parts by weight,
    the phenolic resin is contained by 1 to 4 parts by weight, and
    the crosslinking agent is contained by at least 1 part by weight,
    relative to the ethylene propylene diene rubber and/or ethylene propylene rubber constituting a total of 100 parts by weight.

2. The non-crosslinked rubber laminate according to claim 1, characterized in that the low-molecular-weight polyolefin is a polybutene, and the crosslinking agent is an organic peroxide.

3. A crosslinked rubber laminate which is a rubber laminate comprising a butyl rubber-containing layer stacked with an ethylene propylene diene rubber and/or ethylene propylene rubber-containing layer, said crosslinked rubber laminate characterized in that the ethylene propylene diene rubber and/or ethylene propylene rubber-containing layer is a rubber-containing layer that contains a low-molecular-weight polyolefin and a phenolic resin, and has been crosslinked by a peroxide, where:
    the low-molecular-weight polyolefin has a number-average molecular weight of 300 to 4000 and is contained by 40 to 70 parts by weight, and
    the phenolic resin is contained by 1 to 4 parts by weight, relative to the ethylene propylene diene rubber and/or ethylene propylene rubber constituting a total of 100 parts by weight; and
    the butyl rubber-containing layer is crosslinked and bonded with the ethylene propylene diene rubber and/or ethylene propylene rubber-containing layer.

4. The flexible hose characterized in that it has a structure of the rubber laminate according to claim 3.

5. The flexible hose according to claim 4, characterized in that:
    an innermost layer side of the flexible hose is constituted by the ethylene propylene diene rubber and/or ethylene propylene rubber-containing layer;
    a thickness of the butyl rubber-containing layer is 1.1 mm or more; and
    a thickness of the butyl rubber-containing layer is at least 1.4 times a thickness of the ethylene propylene diene rubber and/or ethylene propylene rubber-containing layer.

* * * * *